United States Patent
Fujiwara

(10) Patent No.: US 6,885,768 B2
(45) Date of Patent: Apr. 26, 2005

(54) IMAGE RECOGNITION APPARATUS, METHOD AND PROGRAM PRODUCT

(75) Inventor: Yoko Fujiwara, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 566 days.

(21) Appl. No.: 09/850,094

(22) Filed: May 8, 2001

(65) Prior Publication Data

US 2001/0041005 A1 Nov. 15, 2001

(30) Foreign Application Priority Data

May 9, 2000 (JP) ........................................ 2000-136301

(51) Int. Cl.⁷ .............................................. G06K 9/00
(52) U.S. Cl. ........................................................ 382/181
(58) Field of Search ................................ 382/177–179, 382/181, 185–190, 206, 229, 298, 317; 715/517–520

(56) References Cited

U.S. PATENT DOCUMENTS

| | | | | |
|---|---|---|---|---|
| 4,953,225 A | * | 8/1990 | Togawa et al. ............. 382/179 |
| 5,077,805 A | * | 12/1991 | Tan ............................. 382/137 |
| 5,123,062 A | * | 6/1992 | Sangu ......................... 382/174 |
| 5,509,092 A | * | 4/1996 | Hirayama et al. .......... 382/301 |
| 5,513,278 A | * | 4/1996 | Hashizume et al. ........ 382/187 |
| 5,613,016 A | * | 3/1997 | Saitoh ......................... 382/174 |
| 5,664,027 A | * | 9/1997 | Ittner .......................... 382/170 |
| 5,719,969 A | * | 2/1998 | Taguchi ...................... 382/311 |
| 6,282,314 B1 | * | 8/2001 | Sugiura et al. ............. 382/173 |
| 6,289,121 B1 | * | 9/2001 | Abe et al. ................... 382/175 |

FOREIGN PATENT DOCUMENTS

JP 09-016582 1/1997

* cited by examiner

*Primary Examiner*—Daniel Miriam
(74) *Attorney, Agent, or Firm*—Burns, Doane, Swecker & Mathis, L.L.P.

(57) ABSTRACT

A digital copying machine 10 having a capability of functioning as an image recognition apparatus detects a character region from input image data and obtains character code data by recognizing character images in the character region. It makes a judgment whether output character images fit into the detected character region when character images are outputted based on the obtained character code data. When output character images do not fit into the detected character region, the character region is enlarged within a specified range.

24 Claims, 13 Drawing Sheets

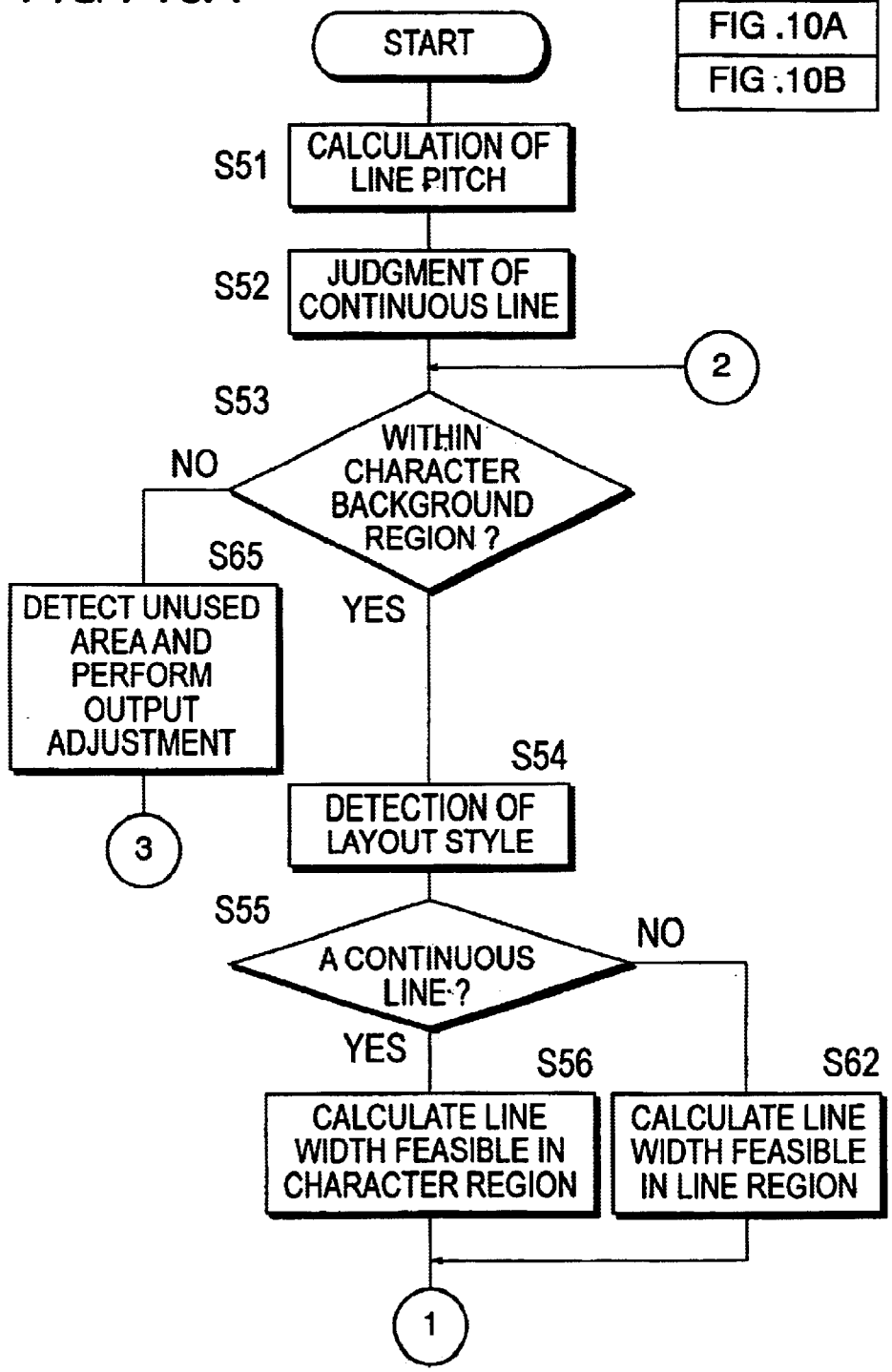

IMAGE RECOGNITION APPARATUS, METHOD AND PROGRAM PRODUCT

This application is based on Japanese Patent Application No. 2000-136301 filed on May 9, 2000, the contents of which are hereby incorporated by reference.

BACKGROUND OF THE INVENTION

1. Field of the Invention

The present invention relates to an image recognition apparatus, method and program product that have a capability of maintaining the original layout when character code data, which are obtained by recognizing character codes from character images included in input image data, are disposed using a particular font.

2. Description of the Related Art

The image recognition apparatus is to analyze image data inputted by scanning an original document by a scanner and the like, extracting each region that contains character images, photograph images or diagram images by each attribute, and conducting recognition process on each region according to its attribute.

In recent years, image recognition apparatuses, having a capability not only to output character code data obtained by recognizing character codes from character images but also to output them maintaining the original document's layout, have been proposed.

For example, an image recognition apparatus is known, which is capable of recognizing from character images font sizes, font types, styles (bold, italics, etc.) and maintaining the original document's layout by outputting character code data including these attributes of characters.

Another image recognition apparatus is also known, which is capable of embedding photographic and diagram images as bit map data into output image data, or recognizing page formats to make it possible to describe them in terms of layout frame styles, so that various styles of files can be prepared.

However, those image recognition apparatuses can recognize only a limited level of font types as character attributes from character images. Moreover, since numerous types of fonts are used on actual documents, it is not realistic to recognize all fonts. Moreover, even if all fonts are accurately recognized and the recognized font is specified and outputted, it is not possible to receive the data with accurate fonts unless the data receiving side is prepared with such fonts.

Therefore, numerous types of fonts existing on original documents (hereinafter "input fonts") have no choice but to be reduced to a limited number of general fonts that are used for outputting character code data (hereinafter "output fonts").

Consequently, it is often impossible to output character code data to have the same character layout as in the original document considering the fact that the width and height of a character vary with the type of a font used when the character code obtained from a character image is outputted in a specific output font.

It is therefore difficult to deal with large varieties of documents even if those image recognition apparatuses mentioned above are equipped with capabilities to maintain document layouts. More specifically, there are problems as described below depending on the fonts and layouts of texts and graphics on an original document, when character code data obtained by recognizing them from character images are outputted in specific output fonts.

For example, if the character width of an output font is greater than the character width of an input font, the character image outputted based on the character code data in the output font may not fit within the character region in the image data obtained by scanning the document, where the character image exists. This causes a problem such that characters and photographs overlap each other, or characters overlap each other on the output image. In some cases, the number of text lines increases in the process, so that the result of scanning one page may result in two pages of output image. On the other hand, when a process of separating a text from a photograph is performed, the photograph may get outputted on a separate page.

SUMMARY OF THE INVENTION

It is an object of the present invention to provide an improved image recognition apparatus, method and program to solve the problems described above.

It is a further object of the present invention to provide an image recognition apparatus, method and program that allow to layout output character images maintaining the original layout and without overlapping other character images or graphic images within one page even when character code data, which are obtained by recognizing character codes from character images included within input image data, are disposed according to a certain specific font.

According to an aspect of the invention we provide an image recognition apparatus comprising: an input unit for inputting image data; and a processor for executing a process comprising the steps of: 1) detecting a character region where character images exist from image data input via said input unit; 2) recognizing character images in said character region to obtain character code data; 3) converting said character code data into output character images; 4) judging whether said output character images fit within said detected character region when said output character images are outputted; and 5) enlarging said character region within a specified range when said output character images do not fit into said character region and judging whether said output character images fit within the enlarged region.

According to another aspect of the invention we provide an image recognition method comprising the steps of: 1) inputting image data; 2) detecting a character region where character images exist from the input image data; 3) recognizing character images in said character region to obtain character code data; 4) converting said character code data into output character images; 5) judging whether said output character images fit within said detected character region when said output character images are outputted; and 6) enlarging said character region within a specified range when said output character images do not fit into said character region and judging whether said output character images fit within the enlarged region.

According to still another aspect of the invention we provide a computer readable program product for recognizing images, said program product causing the computer to execute a process comprising the steps of: 1) inputting image data; 2) detecting a character region where character images exist from the input image data; 3) recognizing character images in said character region to obtain character code data; 4) converting said character code data into output character images; 5) judging whether said output character images fit within said detected character region when said output character images are outputted; and 6) enlarging said character region within a specified range when said output character images do not fit into said character region and judging whether said output character images fit within the enlarged region.

The objects, features, and characteristics of this invention other than those set forth above will become apparent from the description given herein below with reference to preferred embodiments illustrated in the accompanying drawings.

BRIEF DESCRIPTION OF THE DRAWINGS

FIGS. 10A and 10B are flow charts showing the output adjustment process shown in FIG. 9;

DETAILED DESCRIPTION OF THE PREFERRED EMBODIMENT

The embodiment of this invention will be described below with reference to the accompanying drawings.

Figure 1:
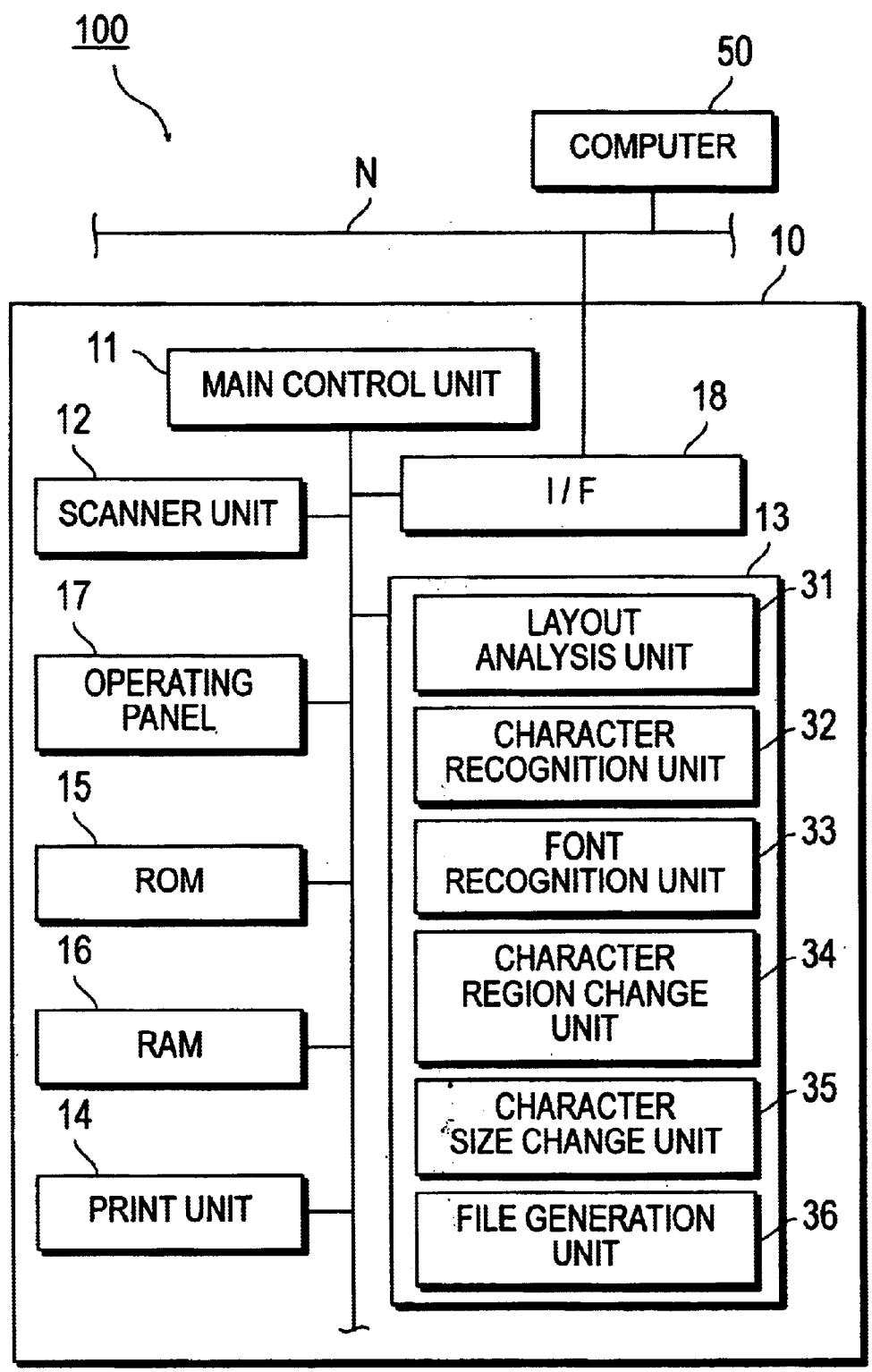
FIG. 1 is an outline block diagram showing the constitution of an information equipment system containing the first embodiment of the image recognition apparatus according to the present invention.

FIG. 1 is an outline block diagram showing the constitution of an information equipment system containing a digital copying machine 10 as the first embodiment of the image recognition apparatus according to the present invention.

As shown in FIG. 1, an information equipment system 100 comprises the digital copying machine 10, a computer 50 and other information equipment interconnected on a network N.

The digital copying machine 10 having a function as an image recognition apparatus comprises a main control unit 11 that integrally controls various parts of the digital copying machine, a scanner 12 that scans documents to obtain image data, an image processing unit 13 that analyzes the image data to obtain character code data by recognizing character codes from character images and conducts processes of data compression, etc., a print unit 14 that prints specific data on paper, a ROM 15 that stores specific programs and data prepared in advance, a RAM 16 that stores data temporarily, an operating panel 17 for displaying various information or by which the user issues instructions, and an interface (I/F) 18 for transmitting or receiving commands and data between the computer 50 and other information equipment.

The digital copying machine 10 and the computer 50 are capable of exchange data via the network N. For example, the digital copying machine 10 can transmit the image data which is obtained by scanning a document by the scanner 12 and is image processed by the image processing unit 13 to the computer 50. It is also possible for the digital copying machine 10 to receive image data from the computer 50 and print it on paper by the printer unit 14.

The digital copying machine 10 has a printing function that uses the printer unit 14 independently and a scanner function which uses the scanner unit 12 independently in addition to the copying function where in image data obtained by scanning a document by the scanner 12 is image processed depending on the necessity and printed in the printer unit 14.

The image data obtained by scanning a document by the scanner 12 is, for example, sent to the image processing unit 13, where the image processing unit 13 recognizes character codes from character images to convert them into character code data, and prepares files of a specified format. The prepared file is transmitted to the computer 50, if there is an instruction to take it into the computer 50 from the operating panel 17 of the digital copying machine 10, and transmitted to the printing unit 14 if there is an instruction to make copy from the operating panel 17. The prepared file can also be transmitted attached to electronic mail via the network N.

As shown in FIG. 1, the image processing unit 13 comprises a layout analysis unit 31, a character recognition unit 32, a font recognition unit 33, a character region change unit 34, a character size change unit 35, and a file generating unit 36.

The layout analysis unit 31 analyzes the input image data, extracts the character region where character images exist, the photograph region where graphic images, i.e., non-character images, exist, and the diagram region where a mixture image of character images and graphic images, such as graphs and charts, exist, respectively depending on the attributes of the image data.

Character images in character regions are analyzed by the character recognition unit 32, which will detect character codes and convert them into character code data. Graphic images within the photographic region are stored, for example, on the file in bit map data as received as the input image data. As to character images in a diagram region, the user determines whether they are to be converted into the character code data or not by selecting the setting on the panel 17.

The extraction of character region, photograph region and diagram region is conducted by the known method. For example, the extraction of the character region is done by measuring the sizes of the areas that are graphically connected in the image data and using a criterion that the sizes of character images are generally smaller than those of other graphic images. Although the layout analysis in this embodiment is done by multi-value image data, it can be done by using the binary image data.

The character recognition unit 32 obtains character code data by recognizing a character code from each character image, and it also recognizes the position information of each character image. The position information of each character image is obtained as, for example, the coordinate of the top left and the bottom right corner of a rectangular shape circumscribed about each character image. The recognition of the character code from the character image is, for example, done based on the degree of matching between the characteristic value of each character image and the dictionary patterns stored in the ROM 15.

The font recognition unit 33 recognizes the type of font and the font size from the character image. For example, the font is identified by classifying it into a specified typical several output fonts using the same as the method of recognition of the character code data as described above.

The character region changing unit 34 can adjust the size of a character region, to which the character image outputted based on the character code data is disposed, to expand from a character region in the image data obtained by scanning the document. The character size change unit 35 can also reduce the size of a character image outputted based on the character code data.

The file generating unit 36 generates a specific format of file by applying a specific process to the input image data such as recognizing a character code from the character image and converting it to a character code data.

Next, the operation of a digital copying machine having a function as the image recognition apparatus constituted as above.

Figure 2:
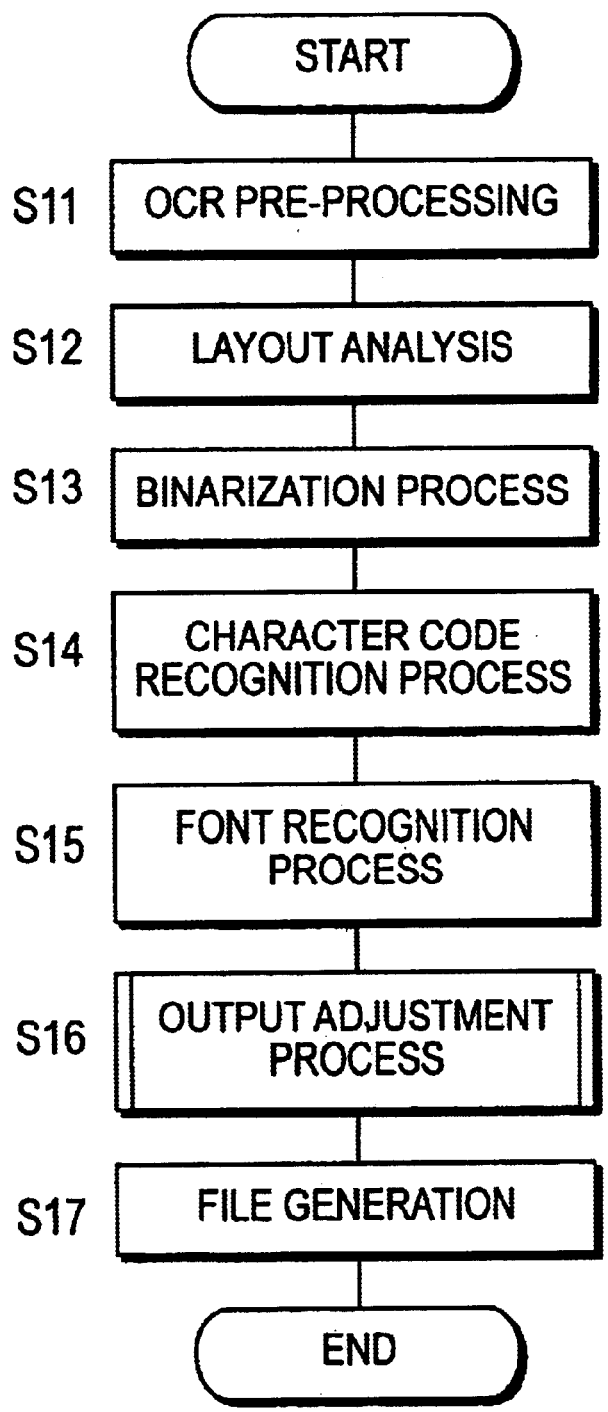
FIG. 2 is a flow chart showing image recognition process of the first embodiment.
Figure 3:
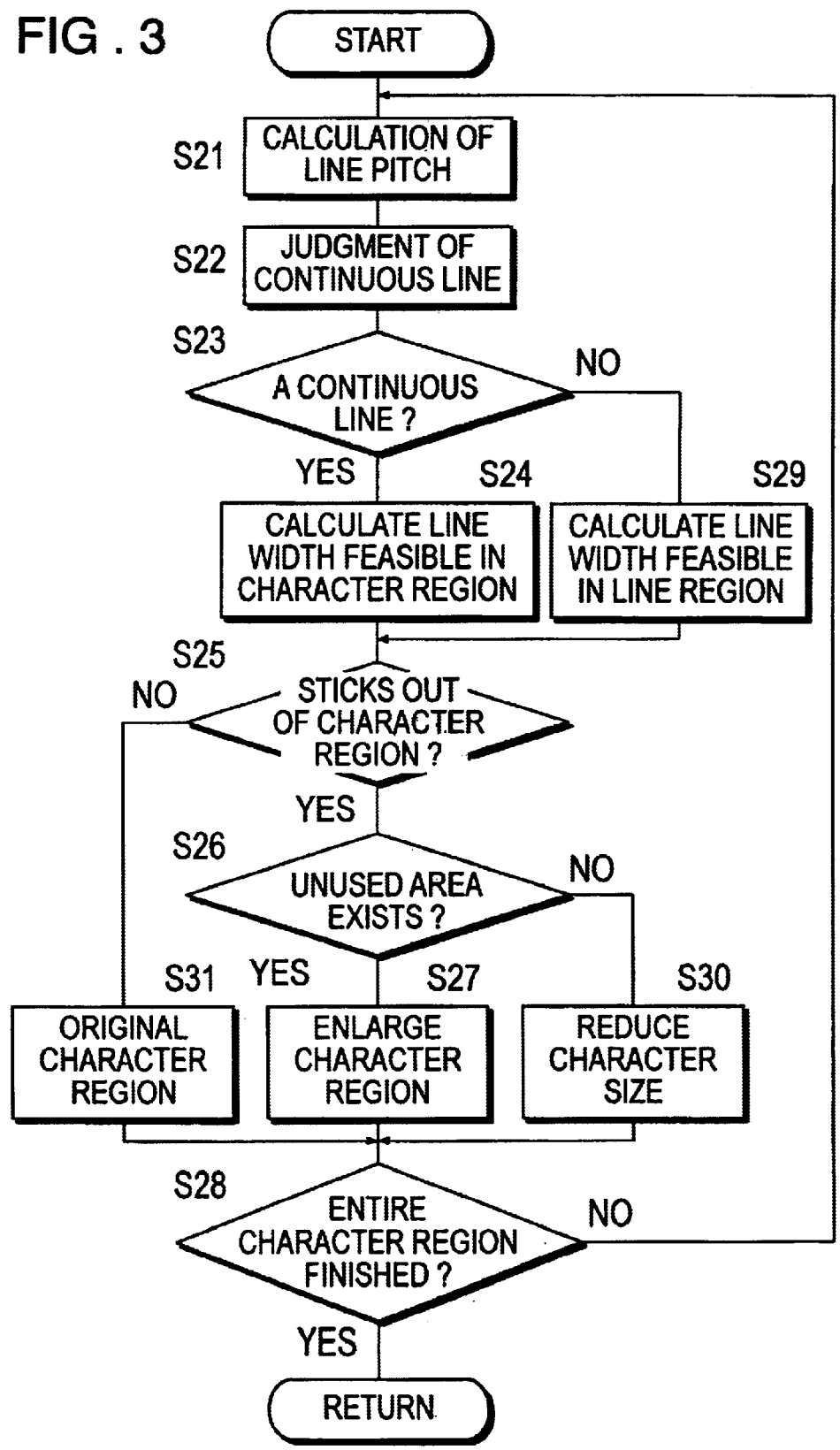
FIG. 3 is a flow chart showing output adjustment process shown in FIG. 2.

FIG. 2 is a flow chart showing the image recognition process and FIG. 3 is a flow chart of the output adjustment process shown in FIG. 2.

An image data is inputted in advance as the document is scanned by the scanner 12. The image data can be inputted by receiving it from external equipment such as a computer 50 via an interface 18. The inputted data is a multi-value image data.

First, the OCR preprocessing is performed (S11). This OCR preprocessing includes noise removal from the input image data and compensation processing for a document scanned in a skewed position.

Figure 4:
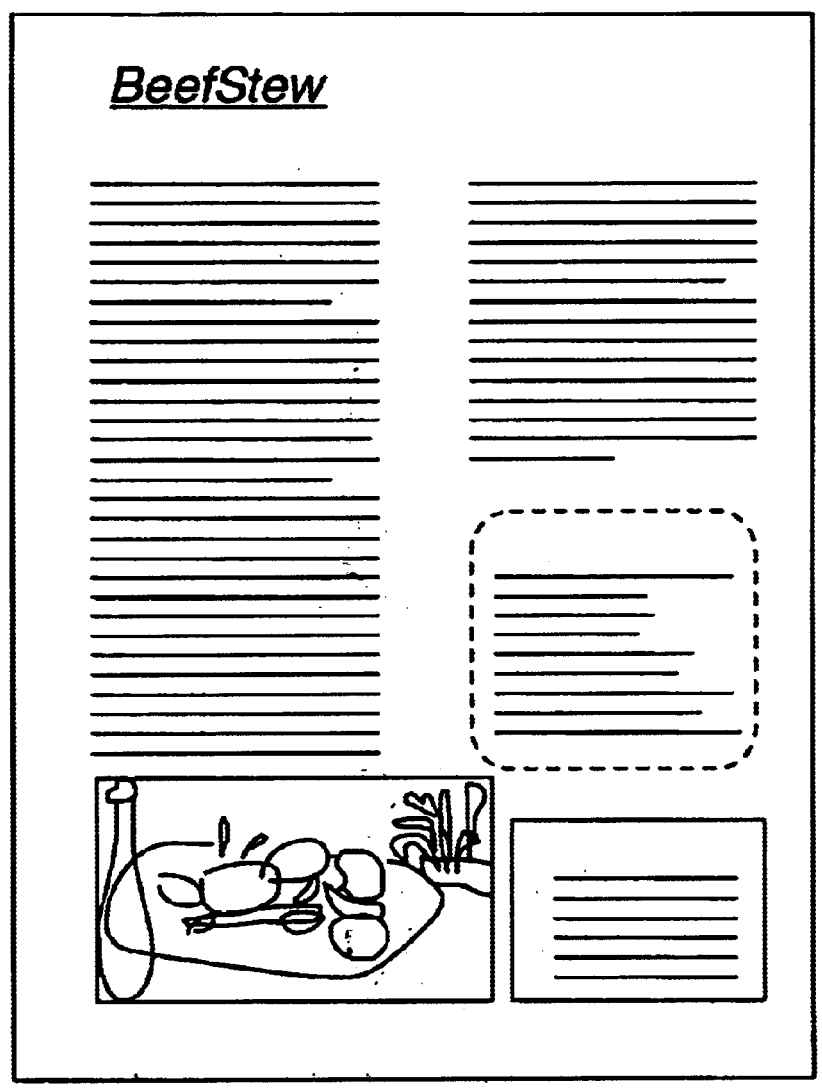
FIG. 4 is a diagram showing an example document.
Figure 5:
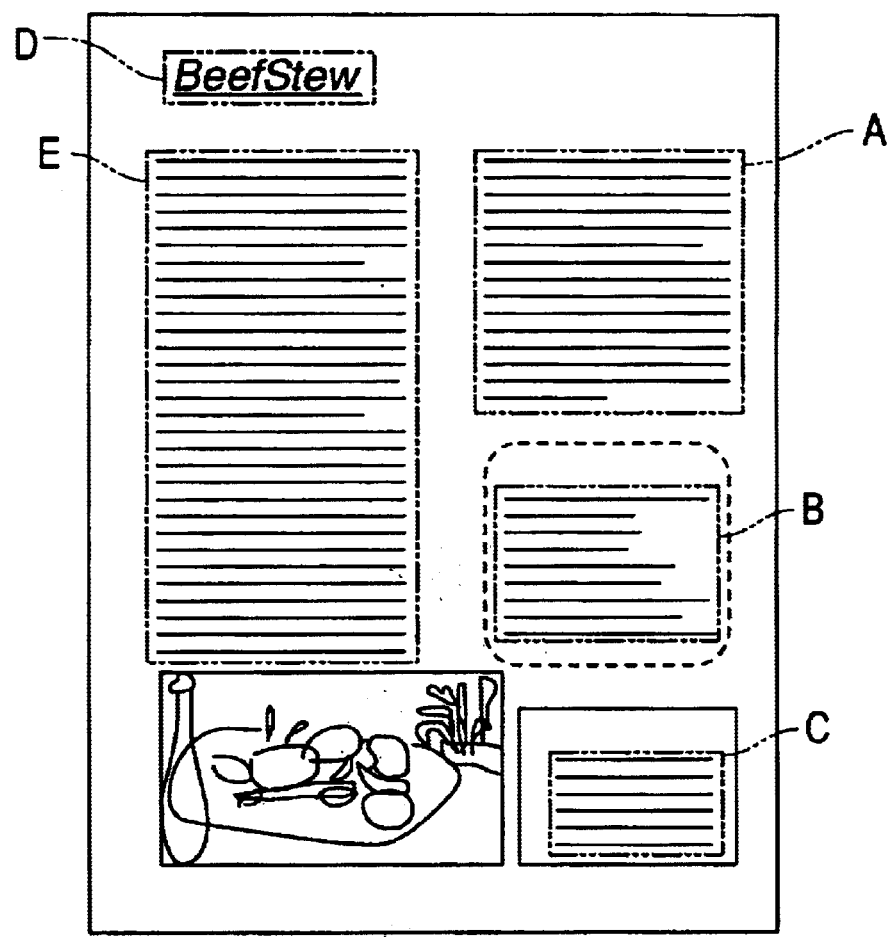
FIG. 5 is a diagram showing the result of detecting character regions by means of conducting layout analysis on image data obtained by scanning the document shown in FIG. 4.

Next, the layout analysis is performed (S12). FIG. 4 is an example of the document, FIG. 5 is a diagram showing the result of detecting character regions by means of conducting layout analysis on image data obtained by scanning the document shown in FIG. 4. As shown in FIG. 5, a rectangular character region A–E where character image exists is detected by the layout analysis unit 31 and extracted. The horizontal solid lines in the character regions A, B, C and E of the diagram denote lateral lines formed by lines of individual character images (hereinafter "line").

After the layout analysis, monochromatic binary image data is generated by conducting binarization on the color or monochromatic multi-value image data in a character region (S13). This makes the character image expressed in the monochromatic binary image data available.

Next, character code data are obtained as character codes are recognized by the character recognition unit 32 from individual character images. Also, position information of each character image is recognized (S14). Further, the type of font and font size are recognized from the character image by the font recognition unit 33 (S15). The font is recognized from typical several output fonts prepared in the image recognition apparatus.

When the character code data thus obtained are arranged in the output image in the output font recognized by the font recognition unit 33, it makes a judgment whether the character image sticks out of a character region in the image data inputted by scanning the document, and the output adjustment process is done according to the judgment result (S16). Although a font recognized by the font recognition unit 33 is normally applied as the output font, it is also possible to constitute in such a way that the user can arbitrarily set up.

In this output adjustment process, the pitch of the lines within the character region is calculated as shown in FIG. 3 (S21). The line pitch is calculated by dividing the height of the character region with the number of lines. The height and width of the character region can be obtained from the layout analysis (S12). Moreover, the number of lines can be obtained by checking the x-coordinate (lateral coordinate) of the circumscribed rectangular shape as position information of each character image one character after another and detecting a line feed when the x-coordinate makes a change in the negative direction (opposite direction). However, this method does not allow us to calculate the line pitch if the particular character region consists of only one line. In such a case, a decision is made not to set up the line pitch.

Next, a judgment is made whether the lines in the character region are continuous lines (S22). The character region A of FIG. 5 shows a case where the lines are continuous and the character region B of the same shows a case where the lines are independent lines.

Figure 6:
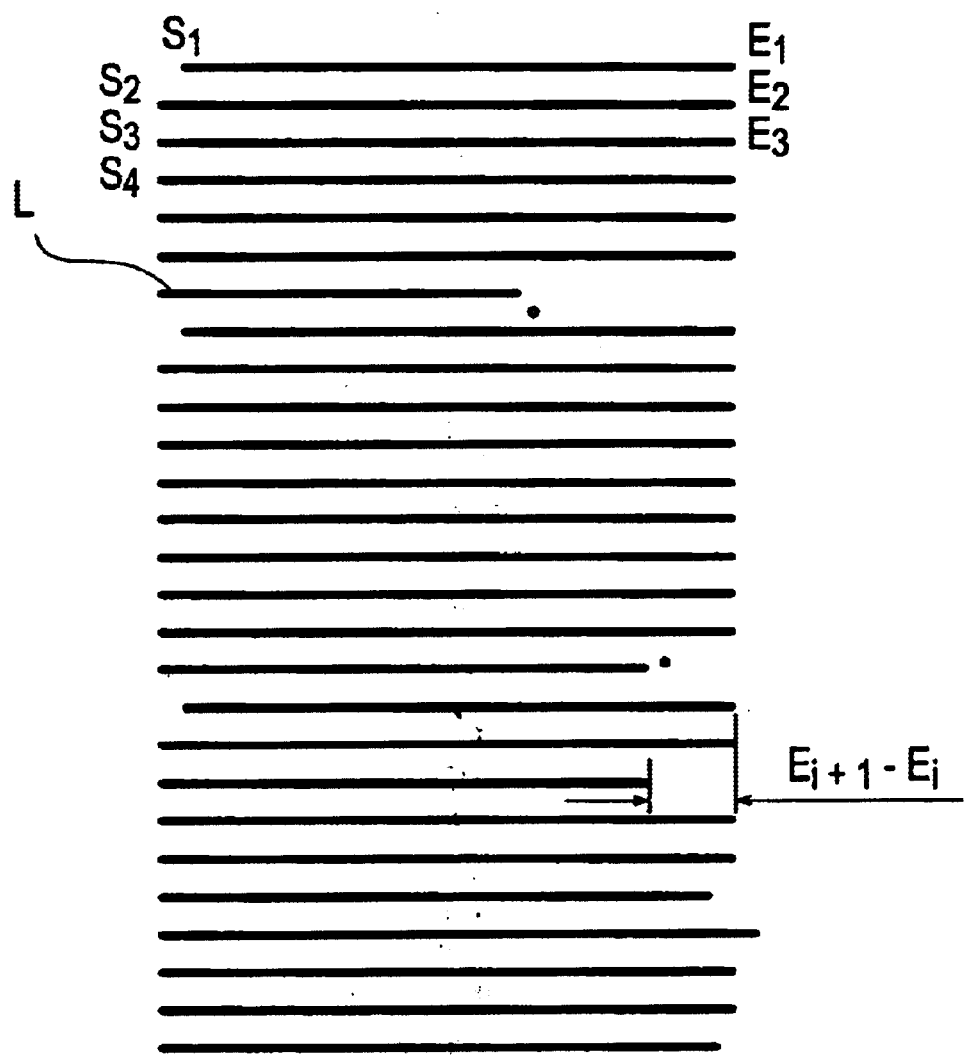
FIG. 6 is a diagram for describing a method of judging whether a line in a character region is a continuous line.

FIG. 6 shows a method for identifying whether a line in a character region is a continuous line. The judgment whether the lines in the character region is continuous can be made by detecting the variations of the starting point and the ending point of each line. More specifically, if the averages of the variations of the starting point and the ending point of each line of a character image that consists of multiple lines in relation to the adjacent lines are greater than a specified value, it is judged that the lines in the character region are independent, and that the lines are continuous if they are smaller than the specified value. With reference to FIG. 6, let $S_i$ (i=1, 2, ...) be the x-axis coordinate of the starting point of the i-th line, $E_i$ (i=1, 2, ...) be the x-axis coordinate of the ending point of the i-th line, and N be the number of lines, and calculate:

$$\Sigma\{(S_{i+1}-S_i)+(E_{i+1}-E_i)\}/N$$

and determine whether the lines within the particular character region are continuous lines based on the size of the calculated value. However, the calculation is performed on the assumption that a line L has no variation of the ending position if the line includes a character image that indicates the end of the sentence such as a period as shown in FIG. 6.

The above steps will provide information on the height and width of the character region, line pitch and number of lines, judgment result on whether the lines in the character region are continuous, character code, font size, type of font, position of each character image (coordinate of the circumscribed rectangle), and font metric data used for outputting. The font metric data is the dimensional data concerning the character width, the character height, etc., of a font. The character width is used as the font metric data in this embodiment.

If the lines in a character region are continuous lines, it is acceptable as long as the output character image based on the character code data obtained by recognizing the character codes from character image can be placed as a whole within the character region of the image data inputted by scanning a document, even if the character widths are different because the output font recognized by the font recognition unit 33 is different from the input font of the characters on the document. On the other hand, if the lines within the character region are not continuous lines but are independent lines such as bulleted items, it would be inappropriate to add a part of a line to another line, as it would make it difficult for the reader to understand the sentence. Therefore, the layout of the output character images which are based on the character code data obtained by recognizing them from character images varies depending on whether the lines within the character region are continuous lines (YES at S23) or the lines are independent lines (NO at S23).

When the lines in a character region are continuous lines (YES at S23), the width of the output character image lines that can be arranged within the character region is calculated (S24).

Let X (i) be the width of the character region in question (i-th character region of multiple character regions where i=1, 2, . . . ) and N (i) be the number of lines in the same region, the width of the output character image lines Lorg (i) in the particular character region can be calculated as follows:

$$Lorg\ (i)=X(i)\cdot N(i)$$

On the other hand, the width, Lout (i), of the output character image lines that are actually disposed can be calculated as follows, assuming Wout (i) be the character width of the font available from the font metric data used for the output and Nc (i) be the number of the character code data:

$$Lout\ (i)=Wout\ (i)\cdot Nc(i)$$

If a font, in which the character width varies with each character code data, is to be used, it is necessary to add the character width Wout (ci) corresponding to each character code data, so that:

$$Lout(i)=\Sigma Wout(i)$$

Next, a judgment is made if the output character image sticks out of the character region of the image data inputted by scanning the document, when the character code data obtained in the above process is outputted using the output font as the character image (S25).

If Lout (i)≦Lorg (i), it is judged that the output character image does not stick out of the character region of the input image data (YES at S25), the character code data will be outputted in the output font as the character image (S31).

On the other hand, if Lout (i)>Lorg (i), it is judged that the output character image does stick out of the character region of the input image data (NO at S25), and a judgment is made whether the character region in which the output character image is disposed can be expanded from the character region in the image data inputted by scanning the document. In other words, a judgment is made whether there is a specified amount of unused portion corresponding to the base region of the document that does not contain either character images or graphic images, i.e., non-character images, adjacent to the character region in the input image data (S26).

Figure 7:
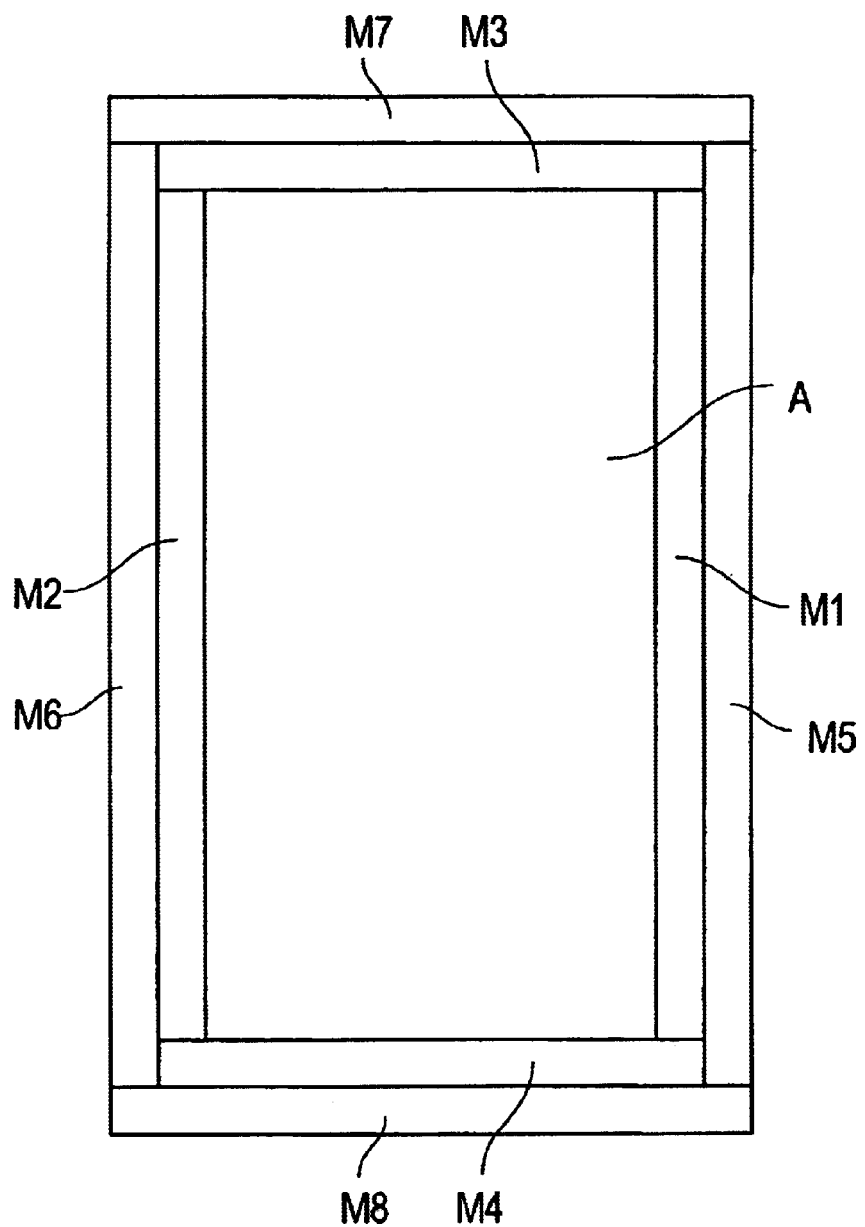
FIG. 7 is a diagram for describing a method of judging whether a prescribed amount of unused area exists.

FIG. 7 is a diagram for describing a method of judging whether a specified amount of unused area exists. A judgment is made whether an unused area exists expanding the area of check with a fixed width (length) increment in four directions, i.e., left, right, above and below, adjacent to a certain character region A in the input image data.

For example, a region M1 adjacent to the character region A on the right side is checked first. The width of the region M1 is chosen to be approximately equal to the character width Wout of the output font. Here, the density of each pixel of the region M1 is checked using the multi-value image data, and it is judged that the region M1 is an unused area that does not contain either character images or graphic images, i.e., non-character images. It is also possible to use binary image data for making a judgment whether the region M1 is unused area.

If the region M1 is determined to be an unused area, another judgment is made whether the output character image sticks out of the character region when the character region is expanded to a region that includes said unused area. If the region M1 is not an unused area, another expansion is not made to the right of the character region A. Similarly, judgments are made sequentially for the regions M2 through M8. The width of the regions adjacent above and below of the character region A is chosen to be approximately equal to the height of the output font.

It is judged that a specified amount of unused area exists if the output character image fits into the expanded character region when the character region is sequentially expanded into the region that contains the unused area in this manner (YES at S26). The character region is expanded to a new region that includes said unused area by means of the character region change unit 34, and the character code data is outputted in the output font as the character image (S27)

In the meantime, if no unused area of a specified amount existed (NO at S26), the output character image based on the character code data within said character region is disposed by reducing the character size by means of the character size change unit 35 so that the output character image can fit within the character region (S30). In order to reduce the character size, a method of reducing the font size is used in this embodiment. However, it is also possible to use a method of specifying a smaller scaling factor for the entire character region.

If a line within the character region is an independent line (NO at S23), the same processing as described above for continuous lines is applied line by line. In other words, the width of the output character image lines is calculated to make it fit within a line region obtained by dividing the character region into the number of lines (S29). A judgment is made whether an unused area exists, expanding the area of check with a fixed width (length) increment in two directions, i.e., left and right, adjacent to said line region. Since other points are the same as in the case of continuous lines, detailed descriptions are not repeated here.

If multiple character regions exist in the input image data, said output adjustment processes (S16, S21–S31) are performed on all character regions (S28).

When the output adjustment process is completed, the system returns to the main flow chart and the character code data in the output adjustment processed character regions are outputted in a specified format of file together with graphic images, etc., for example, in other photographic regions (S17). The output positions of the character image, etc., are specified depending on the file format.

As shown above, it is possible to dispose the output character images within the same page avoiding overlaps with other output character images and/or graphic images while maintaining the original layout even in the case of outputting the character code data, which are obtained by recognizing them from the character images in the input image data, using a specific font.

Figure 8:
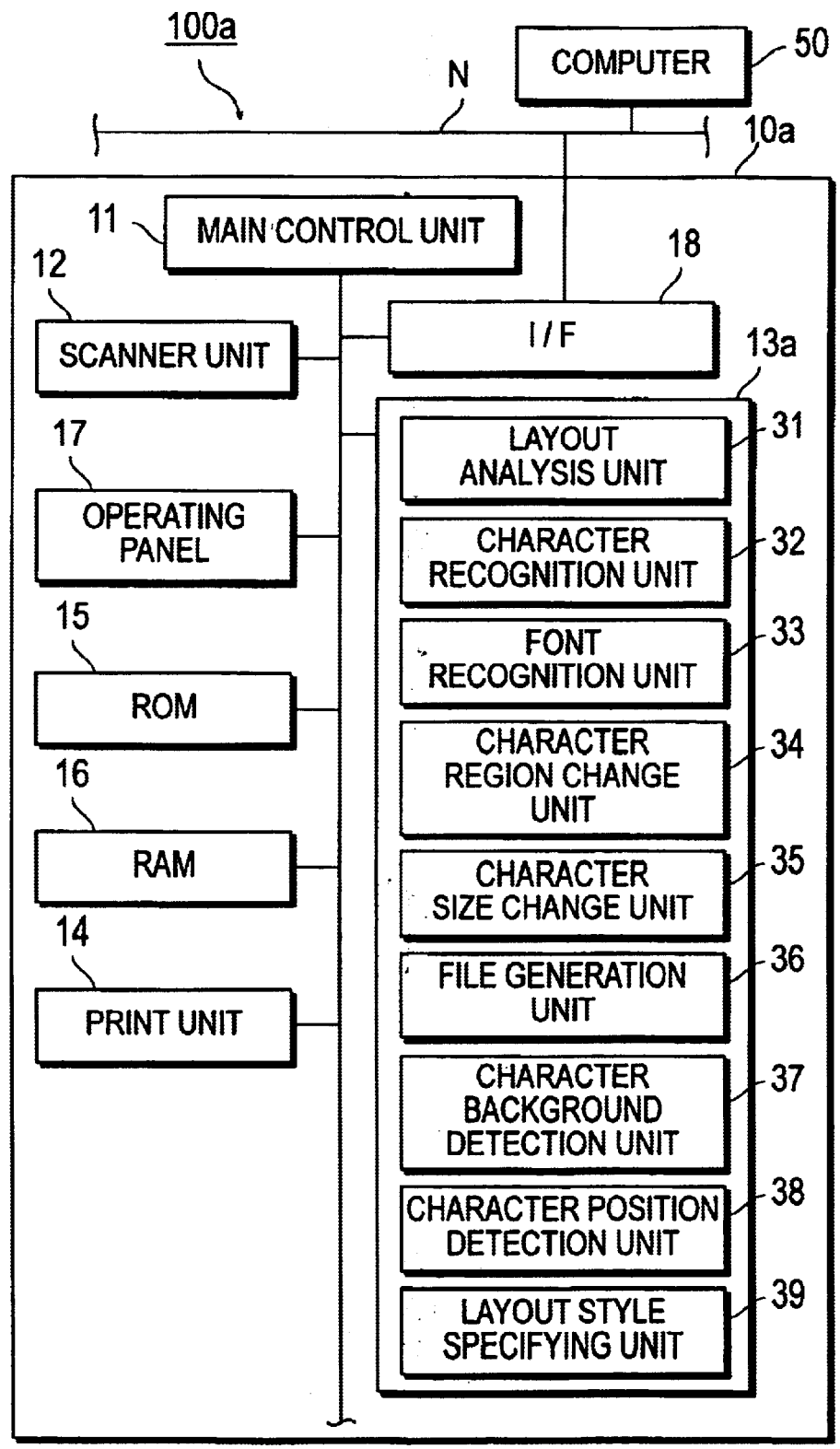
FIG. 8 is an outline block diagram showing the constitution of an information equipment system containing the second embodiment of the image recognition apparatus according to the present invention.

FIG. 8 is an outline block diagram showing the constitution of an information equipment system containing a digital copying machine as the second embodiment of the image recognition apparatus according to the present invention. Differences from the first embodiment will be mainly described below.

In this embodiment, as shown in FIG. 8, an image processing unit 13a comprises a layout analysis unit 31, a character recognition unit 32, a font recognition unit 33, a character region change unit 34, a character size change unit 35, and file generating unit 36, as well as a character background region detection unit 37, a character position detection unit 38 and a layout style specifying unit 39.

Figure 9:
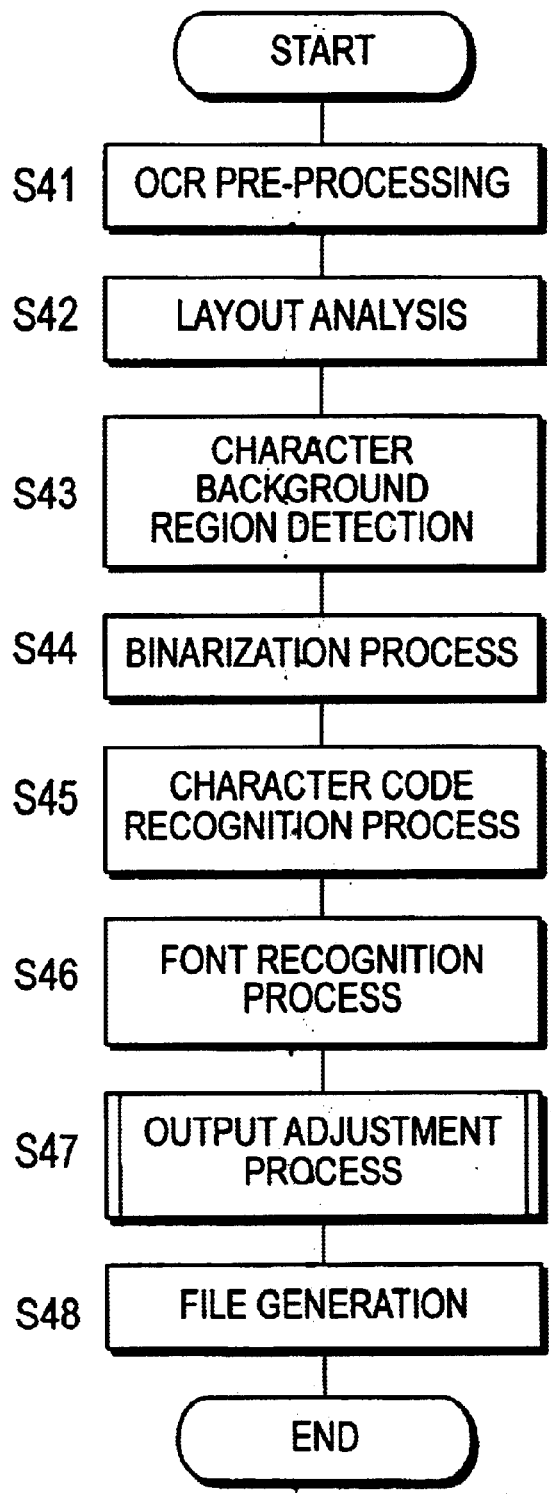
FIG. 9 is a flow chart showing the image recognition process of the second embodiment.
Figure 10B:
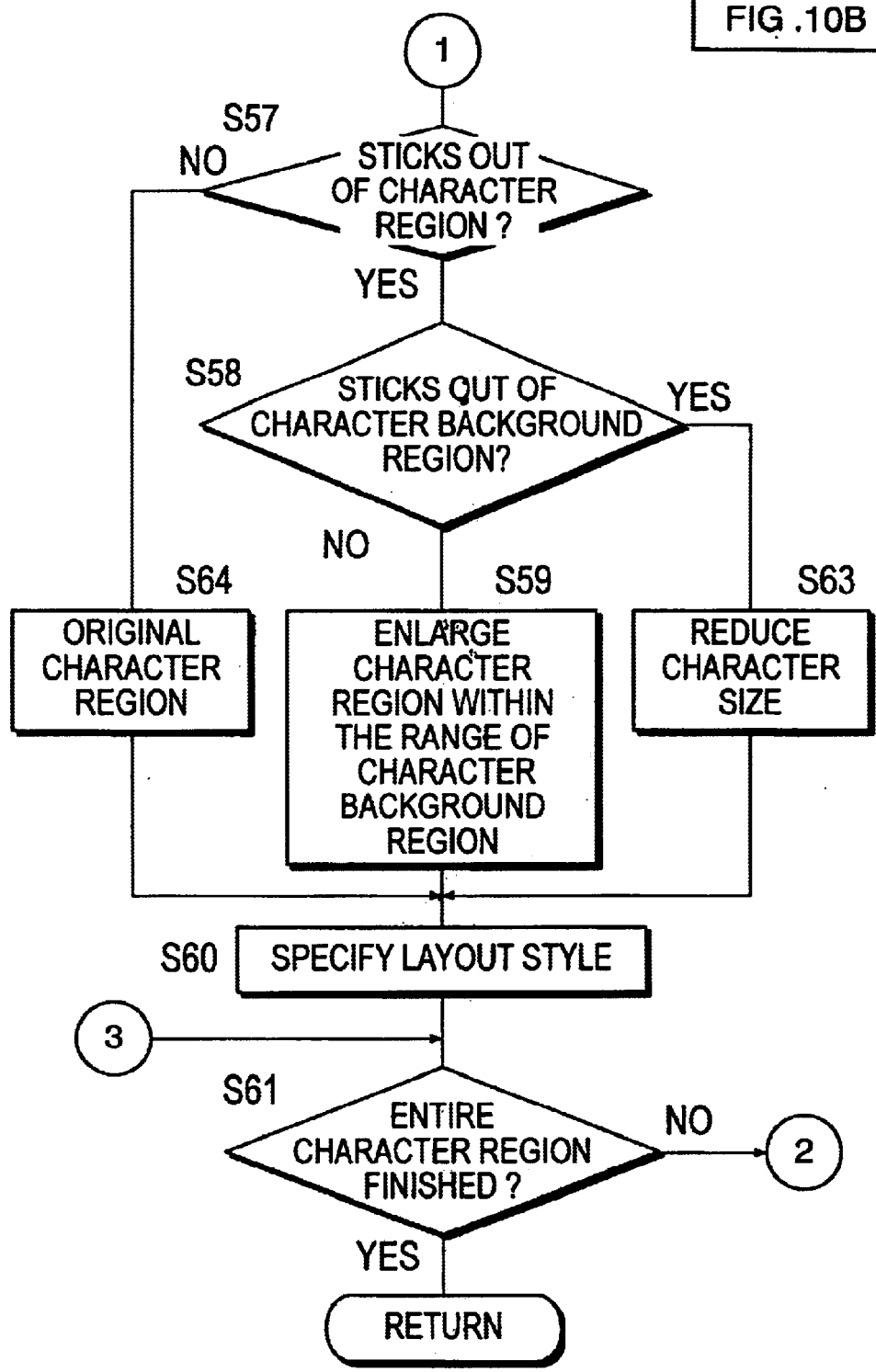

FIG. 9 is a flow chart showing the image recognition process of the second embodiment. FIG. 10A and FIG. 10B show a flow chart showing the output adjustment process shown in FIG. 9.

After the OCR pre-processing (S41) and the layout analysis (S42) are performed similar to those in the first embodiment (S11 and S12 of FIG. 2), the character background region detection will be performed (S43).

Figure 11:
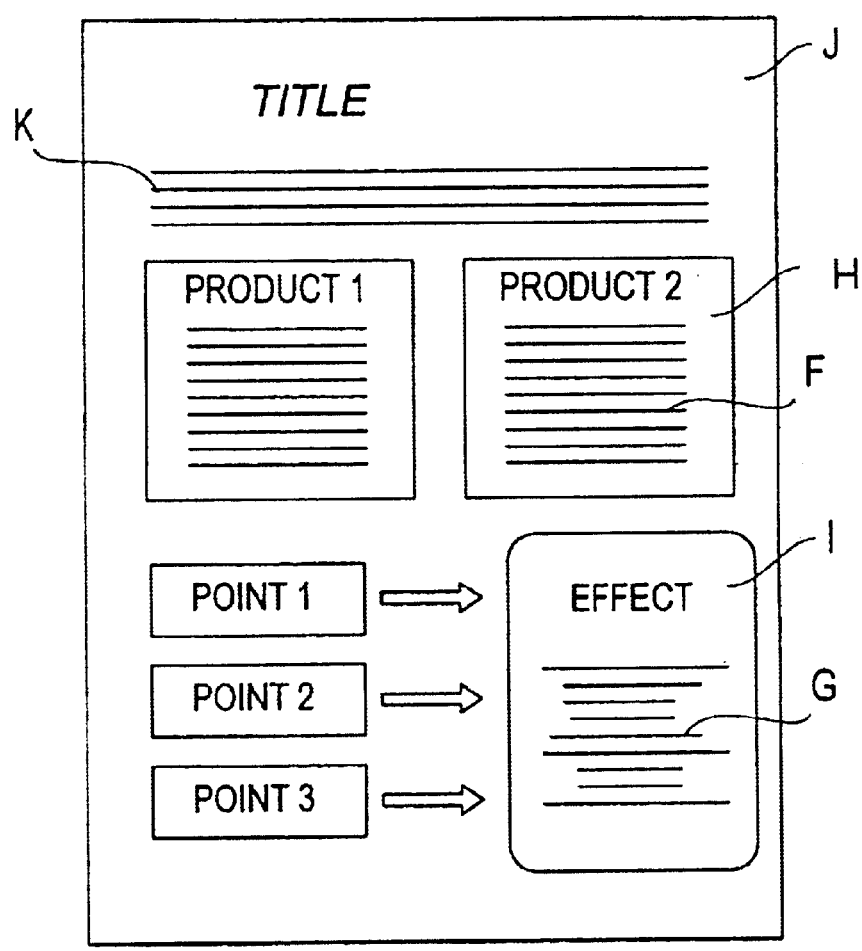
FIG. 11 is a diagram showing an example of detecting character regions and character background regions by means of conducting layout analysis on image data obtained by scanning a document.

FIG. 11 is a diagram showing an example of detecting character regions and character background regions by means of conducting layout analysis on image data obtained by scanning a document.

As shown in FIG. 11, the layout analysis unit 31 detects and extracts, for example, rectangular character regions F, G, etc., where character images exist. The character background region detection unit 37 detects character background regions H and I that contain the character regions F and G respectively and serve as their backgrounds, while existing inside another different background region J. In other words, the background region J corresponds to the base region of the document, and the character background regions H and I exist inside the base region of the document and correspond to regions that are recognized as regions different from the base region. More specifically, the character background regions H and I are regions that have densities or colors different from those of the base region. In order to detect the character background regions H and I, an N×N minimum value filtering processing (a process of choosing the minimum value of N×N pixels in the vicinity of the target pixel as the value of the target pixel) and the like are performed. This makes it possible to detect the character background regions H and I, which are the regions that have a uniform density after being removed of character images and line data. As a result of the detection, the position data of the character background regions H and I as well as color data (density data in case of monochromatic images) within the character background regions H and I are obtained.

Next, the binarization process (S44), the character code recognition process (S45), and the font recognition process (S46) will be performed similar to the first embodiment (S13–S15 of FIG. 2), which will then be followed by the output adjustment process (S47).

In the output adjustment process, as shown in FIG. 10A and FIG. 10B, the line pitch calculation (S51) and a judgment whether lines in a character region are continuous lines (S52) will be performed similar to the first embodiment (S21 and S22 of FIG. 3), which will then be followed by a judgment whether character regions are included in respective character background regions (S53).

For example, if a character region is not included in a character background region as the character region K shown in FIG. 11 (NO at S53), similar processes as the first embodiment (S23–S27, S29–S31 of FIG. 3) will be performed (S65).

If a character region is included in a character background region (YES at S53) and lines in the character region are independent lines, the layout of each line within the character background regions will be detected (S54). In other words, the character position detection unit 38 detects whether the particular lines are left aligned, right aligned or center aligned.

Figure 12:
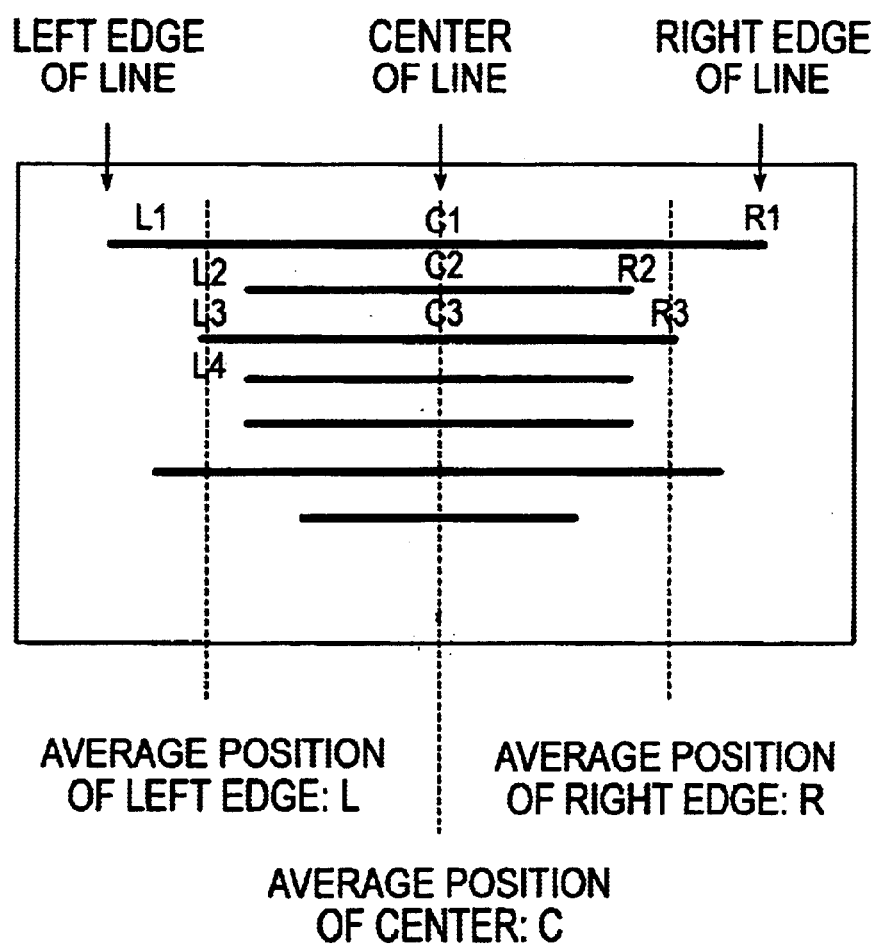
FIG. 12 is a diagram for describing a method of judging where each line is left aligned, right aligned or centered in a character background region.

FIG. 12 is a diagram for describing a method of judging where each line is left aligned, right aligned or centered in a character background region. This judgment is conducted by calculating the sum of the deviations of the x-axis coordinates of the starting point, ending point and center point of each line from their averages within the particular character region, and to see which one has the least total of the deviations.

Let $L_j$ ($j=1, 2, \ldots$) be the start point x-axis coordinate of the j-th line, $R_j$ ($j=1, 2, \ldots$) be the end point x-axis coordinate of the j-th line, $C_j$ ($j=1, 2, \ldots$) be the center point x-axis coordinate of the j-th line, and L, R and C be the averages, the layout of the character image line within the particular character background region can be judged as being:

left aligned if Min $\{\Sigma(L_j-L), \Sigma(R_j-R), \Sigma(C_j-C)\}=\Sigma(L_j-L)$;

right aligned if Min $\{\Sigma(L_j-L), \Sigma(R_j-R), \Sigma(C_j-C)\}=\Sigma(R_j-R)$; and centered if Min $\{\Sigma(L_j-L), \Sigma(R_j-R), \Sigma(C_j-C)\}=\Sigma(C_j-C)$.

If the lines within the character region are continuous (YES at S55), the width of the output character image lines that can be arranged within the character region is calculated (S56) same as in the first embodiment (S24 of FIG. 3). On the other hand, if the lines within a character region are independent (NO at S55), the width of the output character image line is calculated to make it fit within a line region obtained by dividing the character region into the number of lines (S62) same as in the first embodiment (S29 of FIG. 3).

Then, when the thus obtained character code data are outputted in the output font used for outputting as the character image, a judgment is made whether the outputted character image sticks out of the character region in the image data inputted by scanning the document (S57). If the outputted character image does not stick out of the character region in the inputted image data (YES at S57), the character code data are outputted (S64) as the character image using the output font into said character region same as in the first embodiment (S31 of FIG. 3).

In the second embodiment, the process to be taken when the output character image sticks out of the character region in the inputted image data (No at S57) is different from the first embodiment. In other words, it is not to judge whether there is any unused area adjacent in the left, right, top and bottom directions, but rather it is to judge whether an output character image fits within an expanded character region when the character region where the output character image is to be disposed is expanded in the right and left or top and bottom directions within the range of the character background region (S58).

If an output character image fits within a character background region (NO at S58), the character region where the output character image is placed is expanded within the range of the character background region by means of the character region change unit 34, so that the character code data are outputted as a character image using an output font (S59).

On the other hand, even in a case where a character region where an output character image is placed is expanded until it matches with the corresponding character background region, if the output character image does not fit inside the character background region (YES at S58), the output character image within said character region will be disposed by reducing the character size by means of the character size change unit 35 so that the entire output character image fits within the character region (S63).

Next, when the lines within a character region are independent lines, the layout style for each line is specified by the layout style specifying unit 39 based on the detection result of the character position detection unit 38 (S60).

If multiple character regions exist within input image data, the above-mentioned output adjustment processes (S47, S51–S65) will be performed on all the character regions (S61).

When the output adjustment processes are finished, the system returns to the main flow chart, the character code data within the character region where the output adjustment processes are conducted are outputted in a specified format of file together with graphic images, etc., for example, in other photographic regions (S48). The output positions of character image, etc., including the layout style such as the left aligned, right aligned or centered, are specified by different manner depending on the file format.

Thus, in addition to the same effect as that of the first embodiment, the second embodiment provides a capability of placing the obtained character code data within the given character background region even when the character code data are outputted as a character image using a specific font so that it is possible to dispose the output character image within the same page without overlapping with other character images and/or graphic images while properly maintaining the original layout. Moreover, it is possible to layout character images maintaining the styling of each line, i.e., left alignment, right alignment and centering within the given character background regions.

It is obvious that this invention is not limited to the particular embodiments shown and described above but may be variously changed and modified without departing from the technical concept of this invention.

For example, although a digital copying machine having a capability of an image recognizing apparatus is used as an example in the above descriptions, the invention should not be construed to be limited to it. The invention can be applied to a computer that receives image data from a scanner and perform processes similar to the above-mentioned processes, a scanner that performs similar processes and transmit the results to a computer, printer, etc., a printer that receives image data directly from a scanner and performs similar processes, and other similar systems.

In the above embodiments, the image recognition controls is performed as the main control unit 11 executes a specific computer program in which the above processing sequence (see FIG. 2, FIG. 3, etc.) is described. This program can be offered in computer readable recording media such as flexible disks, CD-ROMs, etc. The program can also be provided as an application software program that executes the above process, or can be provided built into various information equipment such as a computer, a digital copier, and a control server.

What is claimed is:

1. An image recognition apparatus comprising:
   an input unit for inputting image data; and
   a processor for executing a process comprising the steps of:
   1) detecting a character region where character images exist from image data input via said input unit;
   2) recognizing character images in said character region to obtain character code data;
   3) converting said character code data into output character images;
   4) judging whether said output character images fit within said detected character region when said output character images are outputted; and
   5) enlarging said character region within a specified range when said output character images do not fit into said character region and judging whether said output character images fit within the enlarged region.

2. An image recognition apparatus as claimed in claim 1 wherein,
   when said processor judges that said output character images do not fit within said enlarged region, said output character images' size is reduced for outputting.

3. An image recognition apparatus as claimed in claim 1 wherein,
   when said processor judges that said output character images fit within said character region or said enlarged region, said output character images' size is not changed for outputting.

4. An image recognition apparatus as claimed in claim 1 wherein,
   when said processor judges that said output character images do not fit within said character region, said character region is enlarged within a range that does not cause any overlapping with other regions that contain images other than character images.

5. An image recognition apparatus as claimed in claim 1 wherein,
   when said processor further judges whether multiple lines consisting of character images in said character region include an independent line that is independent from other lines and, if it is judged that the independent line is included, said steps 4) and 5) will be executed on character images that constitute said independent line in a line by line basis.

6. An image recognition apparatus as claimed in claim 5 wherein,
   when the variations of the start point position and end point position of each line, which is constituted from character images in said character region, relative to those of adjacent lines are greater than specified amounts, said processor judges that said line is the independent line.

7. An image recognition apparatus as claimed in claim 1 wherein,
   said image data includes a background region with specified color or density as background for said character images, and
   said character region is enlarged within the range of said background region when said processor judges that said output character images do not fit into said character region.

8. An image recognition apparatus as claimed in claim 7 wherein,
   said processor further judges whether multiple lines consisting of character images in said character region include an independent line that is independent from other lines and, when it judges that the multiple lines include the independent line, detects layout styles of said independent line in said background region, and disposes output character images based on said detected layout styles.

9. An image recognition method comprising the steps of:
   1) inputting image data;
   2) detecting a character region where character images exist from the input image data;
   3) recognizing character images in said character region to obtain character code data;
   4) converting said character code data into output character images;
   5) judging whether said output character images fit within said detected character region when said output character images are outputted; and 6) enlarging said character region within a specified range when said output character images do not fit into said character region and judging whether said output character images fit within the enlarged region.

10. An image recognition method as claimed in claim 9 wherein, when it is judged at said step 6) that said output character images do not fit within said enlarged region, said output character images' size is reduced for outputting.

11. An image recognition method as claimed in claim 9 wherein, when it is judged at said step 6) that said output character images fit within said character region or said enlarged region, said output character images' size is not changed for outputting.

12. An image recognition method as claimed in claim 9 wherein, when it is judged at said step 5) that said output character images do not fit within said character region, said character region is enlarged within a range that does not cause any overlapping with other regions that contain images other than character images.

13. An image recognition method as claimed in claim 9 further comprising the step of:

7) judging whether multiple lines consisting of character images in said character region include an independent line that is independent from other lines, and wherein if it is judged at said judging step 7) that the independent line is included, said steps 5) and 6) will be executed on character images that constitute said independent line in a line by line basis.

14. An image recognition method as claimed in claim 13 wherein, when the variations of the start point position and end point position of each line, which is constituted from character images in said character region, relative to those of adjacent lines are greater than specified amounts, it is judged that said line is the independent line at said judging step 7).

15. An image recognition method as claimed in claim 9 wherein, said image data includes a background region with specified color or density as a background for said character images, and said character region is enlarged within the range of said background region when it is judged at said step 5) that said output character images do not fit into said character region.

16. An image recognition method as claimed in claim 15 further comprising the steps of:

8) judging whether multiple lines consisting of character images in said character region include an independent line that is independent from other lines; and 9) detecting layout styles of said independent line in said background region and disposing output character images based on said detected layout styles when it is judged at said judging step 8) that they include the independent line.

17. A computer program product stored on a computer readable medium for recognizing images, said program product causing the computer to execute a process comprising the steps of:

1) inputting image data;

2) detecting a character region where character images exist from the input image data;

3) recognizing character images in said character region to obtain character code data;

4) converting said character code data into output character images;

5) judging whether said output character images fit within said detected character region when said output character images are outputted; and 6) enlarging said character region within a specified range when said output character images do not fit into said character region and judging whether said output character images fit within the enlarged region.

18. A program product as claimed in claim 17 wherein, when it is judged at said step 6) that said output character images do not fit within said enlarged region, said output character images' size is reduced for outputting.

19. A program product as claimed in claim 17 wherein, when it is judged at said step 6) that said output character images fit within said character region or said enlarged region, said output character images' size is not changed for outputting.

20. A program product as claimed in claim 17 wherein, when it is judged at said step 5) that said output character images do not fit within said character region, said character region is enlarged within a range that does not cause any overlapping with other regions that contain images other than character images.

21. A program product as claimed in claim 17 wherein, said process further comprising the step of:

7) judging whether multiple lines consisting of character images in said character region include an independent line that is independent from other lines, and wherein if it is judged at said judging step 7) that the independent line is included, said steps 5) and 6) will be executed on character images that constitute said independent line in a line by line basis.

22. A program product as claimed in claim 21 wherein, when the variations of the start point position and end point position of each line, which is constituted from character images in said character region, relative to those of adjacent lines are greater than specified amounts, it is judged that said line is the independent line at said judging step 7).

23. A program product as claimed in claim 17 wherein, said image data includes a background region with specified color or density as a background for said character image, and said character region is enlarged within the range of said background region when it is judged at said step 5) that said output character images do not fit into said character region.

24. A program product as claimed in claim 23 wherein, said process further comprising the steps of:

8) judging whether multiple lines consisting of character images in said character region include an independent line that is independent from other lines; and 9) detecting layout styles of said independent line in said background region and disposing output character images based on said detected layout styles when it is judged at said judging step 8) that they include the independent line.

* * * * *